United States Patent [19]
Brown

[11] 3,953,676
[45] Apr. 27, 1976

[54] DIGITAL CONTROL OF A LOUDSPEAKING TELEPHONE SYSTEM

[75] Inventor: Russel William Brown, Ottawa, Canada

[73] Assignee: Northern Electric Company, Limited, Montreal, Canada

[22] Filed: Dec. 12, 1974

[21] Appl. No.: 531,823

[52] U.S. Cl. ............................. 179/1 HF; 179/81 B
[51] Int. Cl.² ........................................ H04M 9/08
[58] Field of Search ............... 179/1 HF, 1 H, 1 VC, 179/1 VL, 37, 81 B, 170.6, 170.8, 1 FS

[56] References Cited
UNITED STATES PATENTS

| | | | |
|---|---|---|---|
| 3,136,864 | 6/1964 | Cleary | 179/1 VC |
| 3,330,912 | 7/1967 | Koseki | 179/81 A |
| 3,660,603 | 5/1972 | Andersen | 179/1 VC |
| 3,725,585 | 4/1973 | Moniak et al. | 179/1 HF |
| 3,794,763 | 2/1974 | Boudewijns et al. | 179/1 H |
| 3,832,491 | 8/1974 | Sciulli et al. | 179/1 VC |
| 3,860,756 | 1/1975 | Shinoi et al. | 179/1 HF |
| 3,894,187 | 7/1975 | Shibata et al. | 179/1 HF |

FOREIGN PATENTS OR APPLICATIONS

| | | | |
|---|---|---|---|
| 3,952,192 | 9/1964 | Japan | 179/1 VC |

*Primary Examiner*—Thomas W. Brown
*Attorney, Agent, or Firm*—Achmed N. Sadik

[57] ABSTRACT

Two digitally controllable attenuator networks are provided in the receiver and transmit channels of a loudspeaking telephone system. The analog control signal usually utilized to control the total loop gain in such systems is converted to a digital representation and its complementary representation, one of which is then applied to control the transmit attenuator and the other to control the receive attenuator. Stable, thump-free control of the loop gain is thus achieved.

13 Claims, 4 Drawing Figures

DIGITAL CONTROL OF A LOUDSPEAKING TELEPHONE SYSTEM

FIELD OF THE INVENTION

The present invention relates to loudspeaking (handsfree) telephone systems in general, and particularly to the utilization of digital techniques to control the loop gain therein.

BACKGROUND AND PRIOR ART OF THE INVENTION

In order for loudspeaking telephone sets to function properly, without the troublesome instability sometimes known as the "Larsen Effect", the loop gain encompassing the acoustical coupling path between receiver and microphone must at all times be less than unity. It is, therefore, necessary that the net gain of the transmit plug receive channels be below a critical value, beyond which the said loop gain would exceed unity and oscillation sets in.

A simple (but crude) solution to such problem is to cut off the transmit channel completely while receiving and vice versa. In U.S. Pat. No. 3,725,585 issued Apr. 3, 1973 to Moniak et al, this is accomplished by comparing the receive and transmit signals and switching the circuit in favour of the channel carrying the larger amplitude.

More sophisticated approaches do not effect complete cut-off of one channel in favour of the other, but utilize analog, active variable gain or loss devices in each of the receive and transmit channels to maintain the net gain below the critical value. The variable gain (or loss) devices are controlled by a signal derived from a comparison between the levels in the transmit and receive channels. Such a system is generally disclosed in commonly assigned U.S. Pat. No. 3,889,059 issued to J. L. E. Thompson et al on June 10, 1975 and titled: "LOUDSPEAKING COMMUNICATIONS TERMINAL APPARATUS AND METHOD OF OPERATION". While this approach eliminates the disadvantages of voice operated switching mentioned supra, it creates yet another problem known in the art as "thump". Thump is the undesirable effect of feedthrough of the control signal into the actual speech path. This effect is difficult to suppress due to the closeness of the lower cut-off frequency (300 Hz) of telephone channels to the frequencies present in the varying control signal. In order to reduce this undesirable interference, balanced circuit configurations at the interface points with the control signal are often necessary. Such circuit configurations invariably require component matching and/or critical adjustments in the circuit and are, therefore, not inexpensive to implement; yet they do not provide complete freedom from the objectionable thump.

In some instances, the control signal may contain frequency components within the voice frequency band, and the problem of thump is aggravated. The present invention, in addition to other advantages, endeavours to mitigate the possibility of injection of the control signal into the speech path by means of a reliable, uncritical method and circuit.

SUMMARY OF THE INVENTION

The novel solution of the present invention in its broad aspect comprises the provision in the speech paths in the receive and transmit channels of digitally controllable attenuator networks adapted to respond to a digital representation of a control voltage. The control voltage may vary between high and low values, and if the high value corresponds to "full transmit" and the low corresponds to "full receive" then the digital representation controls the receive attenuator while its complement representation controls the transmit attenuator, and vice versa. The complement representation here being defined as the maximum permitted numerical value of the representation minus its momentary value. The control voltage may be generated by a similar circuit to that disclosed in the above-mentioned copending and commonly assigned application of Thompson et al. However, it is the control voltage that determines the general behaviour of the system, and different system designers may choose different circuits with variant characteristics.

As a result of the foregoing method any increase in the attenuation in either of the receive or transmit paths is accompanied by an equivalent decrease in the other. The total attenuation thus remains unchanged and hence also the net loop gain below the critical value. This improvement is achieved without the uncertainty of critical adjustments, and is as stable as the passive attenuators can be made to be.

In a narrower aspect of the above method, it comprises the additional preliminary step of sensing the control signal to provide a limited amount of hysteresis such that within a predetermined range of the control voltage the system is quiescent, and a new digital representation is established only after such range has been exceeded. This is only to prevent the system from being unstable around a single quiescent threshold.

A circuit in accordance with the present invention comprises analog-to-digital converter means responsive to a control voltage for coding the same into a digital representation; means responsive to the analog-to-digital converter means for generating the complement representation of said digital representation; and two variable attenuators one adapted to respond to said digital representation and the other adapted to respond to the said complement representation, a predetermined one of the two attenuators being in the receive channel and the other in the transmit channel of the loudspeaking telephone system.

In a narrower aspect of the above circuit, the variable attenuators are simple resistor ladder networks made variable by means of gated switching devices connected in series with the shunt resistors in the ladder. Due to the lack of any direct current biasing, the devices thus operate as pure a.c. attenuators. Moreover, the attenuation is dependent only on resistor ratios, where accuracy and stability are easy to achieve, independent of supply voltage variations or other misadjustments.

BRIEF DESCRIPTION OF THE DRAWINGS

Now an example embodiment of the invention will be described in detail in conjunction with the drawings in which.

DESCRIPTION OF THE PREFERRED EMBODIMENT

Figure 1:
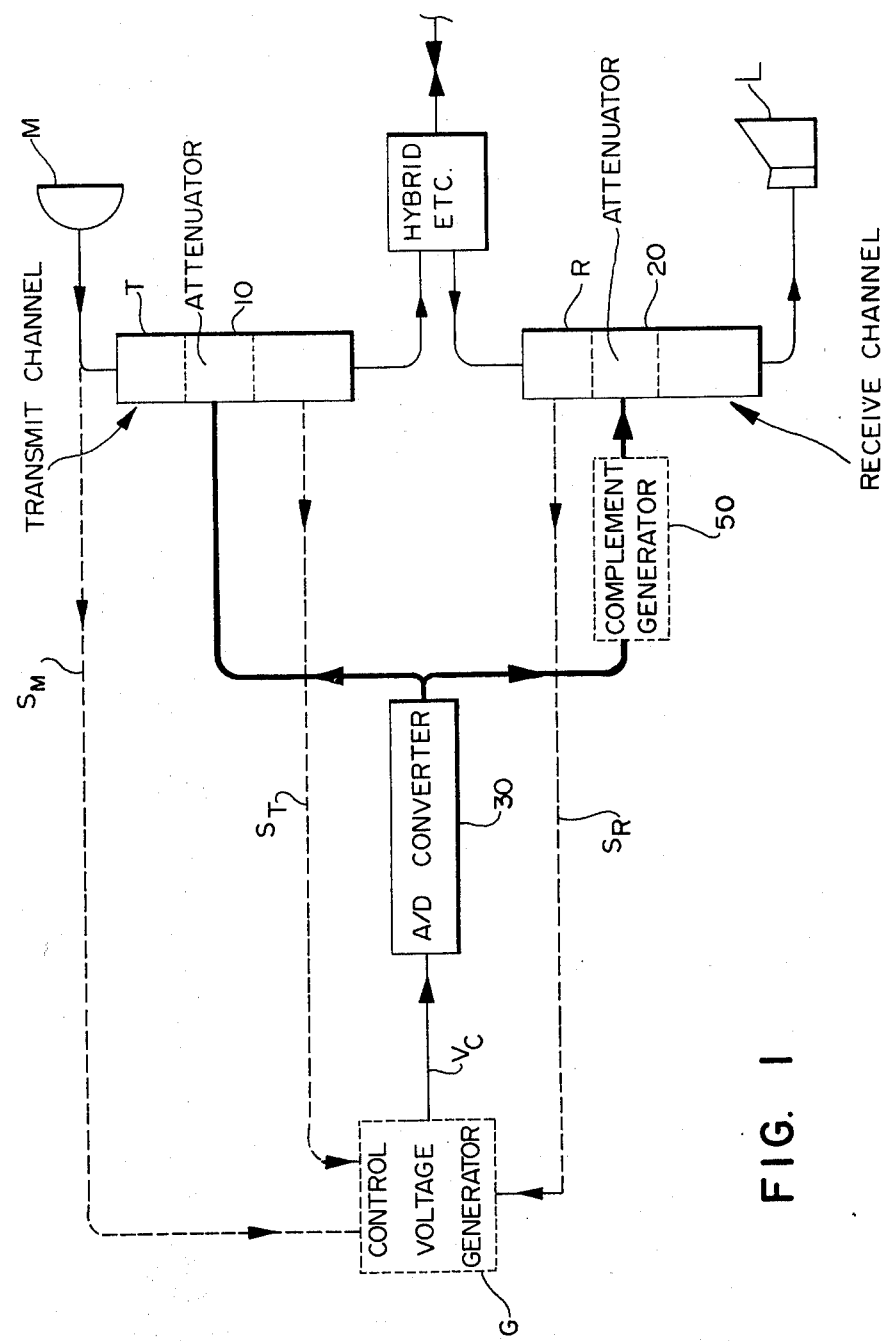
FIG. 1 is an overall block schematic illustrating a loudspeaking telephone system embodying the method of the present invention.

FIG. 1 of the drawings shows a block diagram of how the present invention is utilized in a loudspeaking telephone system. In this particular case, the control voltage $V_c$, as disclosed in the aforementioned copending application of Thompson et al, is a function of the microphone signal $S_M$, the transmit signal $S_T$ past the transmit attenuator 10, and the receive signal $S_R$ before the receive attenuator 20. The important characteristic of the control voltage $V_c$ is that it varies between an upper and a lower limit. How it is derived and how it varies therebetween is at the discretion of the system designer, depending on the desired behaviour of the system. Likewise, the particular manner in which the transmit and receive channels T and R are realized is outside the immediate concern of the present invention.

Figure 2:
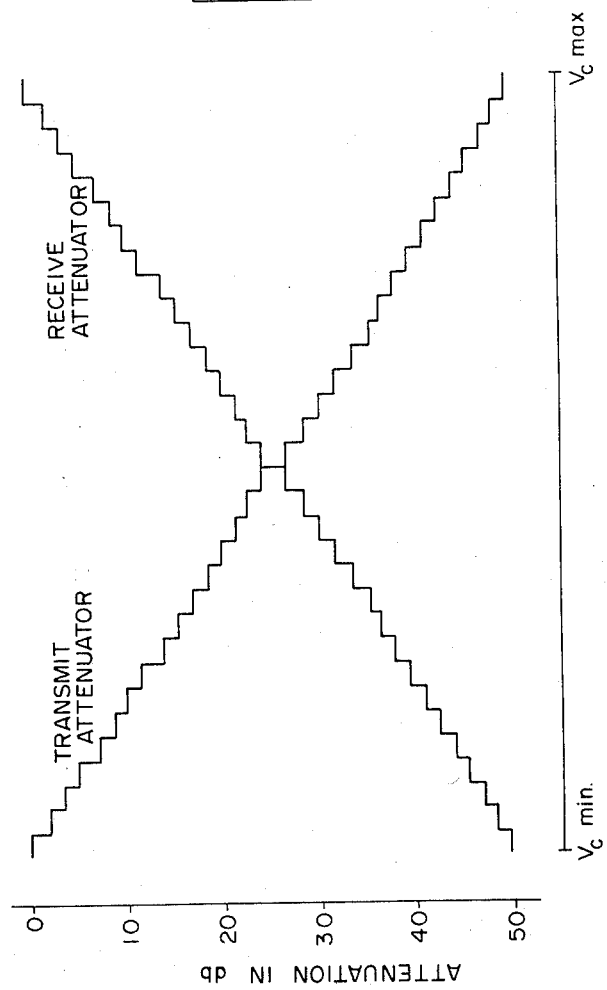
FIG. 2 is a graph showing the transmit and receive attenuation as a function of the control voltage in the system of FIG. 1.

The method of the present invention as elucidated by the system outlined in FIG. 1 is generally as follows. The control voltage generator G compares signals from the microphone M, the transmit channel T and the receive channel R and delivers a particular analog value of control voltage to the input of the A/D converter 30, which in turn converts that value into a digital representation. The latter is immediately applied to the transmit attenuator 10 in the transmit channel T. The digital representation also is continuously converted into its complement in complement generator 50. The complement representation itself is applied to control the attenuation of the receive attenuator 20 in the receive channel R. The resultant behaviour of the attenuation in the transmit channel T, as well as in the receive channel R is shown in FIG. 2 as a function of the input control voltage $V_c$. The change in attenuation is, of course, stepwise and the size of the step is again at the discretion of the designer. It has been found, however, that a step size of approximately 1.6dB is satisfactory to the human ear in that it generally cannot be distinguished from a continuous change. The maximum dynamic attenuation required divided by the step size plus one, yields the total number of states necessary at the output of the A/D converter 30. The number of bits in a binary representation, then, is:

$$\text{Number of Bits} = \text{ld} \left[ 1 + \frac{\text{Total Dynamic Attenuation}}{\text{Att. Step Size}} \right];$$

where ld denotes the logarithm to the base 2.

As a result of using the binary word and its complement to control and determine the attenuation in the transmit and receive paths, the total overall loop gain of the system (including the coupling path between the microphone M and loudspeaker L) remains constant without resort to any critical or other adjustments. Such loop gain must of course be less than unity, which is the condition for stability (no oscillation). The receive attenuator 20 is thus increased by the same amount by which the transmit attenuator 10 is decreased, and vice versa. The sum of attenuation in both attenuators 10 and 20 is always equal to the maximum dynamic attenuation, which is approximately 50dB in FIG. 2. It is assumed (and preferred) that the attenuators in the transmit and receive channels be identical.

Figure 3:
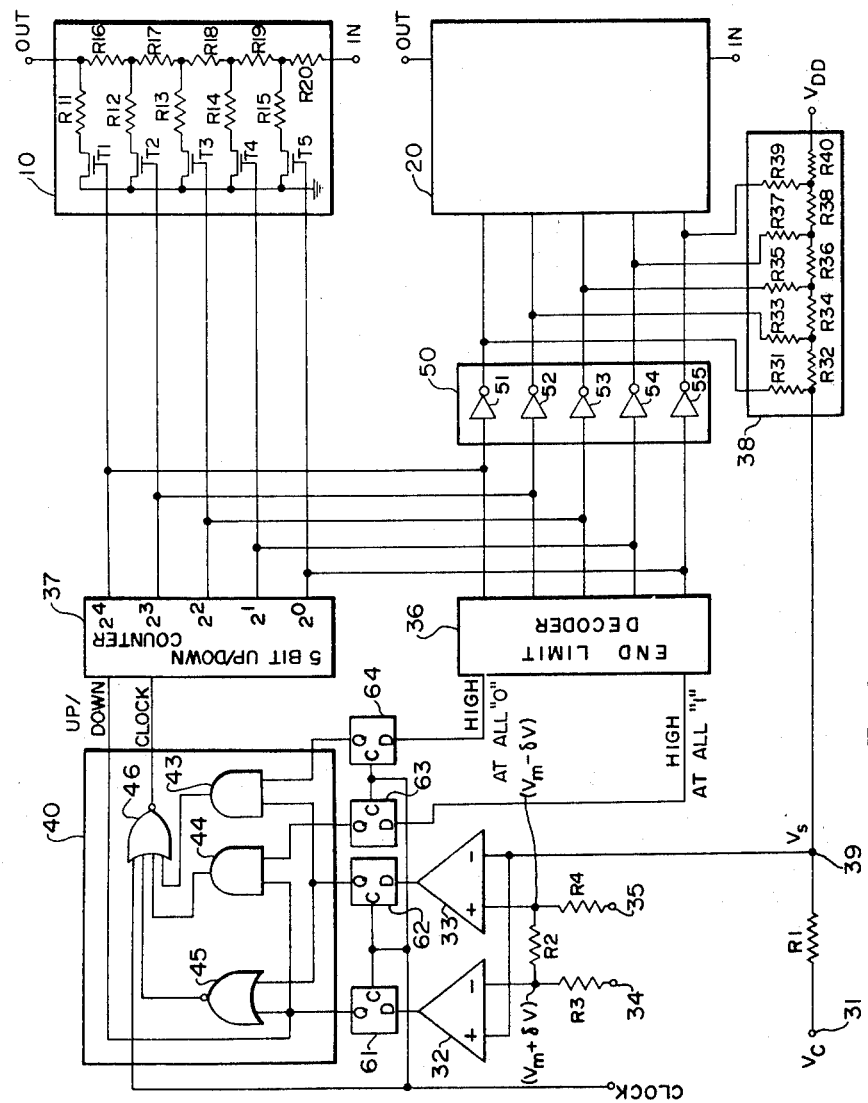
FIG. 3 is a detailed block schematic showing a circuit according to the present invention.

Turning now to FIG. 3, the preferred circuit embodiment shall be described in detail. The control voltage $V_c$ is applied to terminal 31 connected by resistor R1 to the non-inverting and inverting inputs of comparators 32 and 33, respectively. The other inputs of the comparators 32 and 33 are connected to each other via resistor R2, which through resistors R3 and R4 and the voltage applied to terminals 34 and 35 develops a voltage drop $2\delta V$. The outputs of the comparators 32 and 33 are connected each to the D input of D-flip-flops 61 and 62 respectively. The Q outputs of D-flip-flops 61 and 62 as well as 63 and 64, which perform similar functions in the two leads from decoder 36, drive logic circuit 40. These D-flip-flops 61 to 64 serve only to sample and hold the input information to the logic circuit 40 in order to ensure that this information is stable and does not change at the instant that the counter 37 is clocked. The D-flip-flops 61 to 64 must, therefore, sample at the clock edge opposite that which advances the counter 37. In the logic circuit 40, AND gates 43 and 44 are driven from decoder 36, which causes the counter 37 to stop counting beyond the limits when the maximum (all "1") or minimum (all "0") counts have been reached. The decoder 36 is controlled by the counter 37. Since the A/D converter shown in FIG. 3 is of the tracking type, a ladder network 38 is necessary to convert the inverted digital output of counter 37 to an analog voltage and feed this analog voltage back to the summing point 39 where it is summed with the input voltage $V_c$ to bring the voltage $V_s$ within $\pm \delta V$ from the median voltage $V_m$ of the reference inputs of the comparators 32 and 33. When $V_s$ is within $\pm \delta V$ of the $V_m$ the coding operation ends and the counter 37 is stopped so that the transmit and receive attenuators 10 and 20 each present the appropriate attenuation in their respective channels.

The ladder network 38 comprises resistors R31 to R40, the values of which are:

R31, R33, R35, R37, R39 and R40   = 100 kOhm;
R32, R34, R36 and R38   = 50 kOhm.

This is a so-called R/2R constant impedance ladder.

The parallel outputs of the counter 37 drive the transmit attenuator 10 and also the complement generator 50, which in the present case consists of 5 separate inverters 51 to 55. The complement generator 50 drives the receive attenuator 20, which is identical to the transmit attenuator 10.

Figure 4:
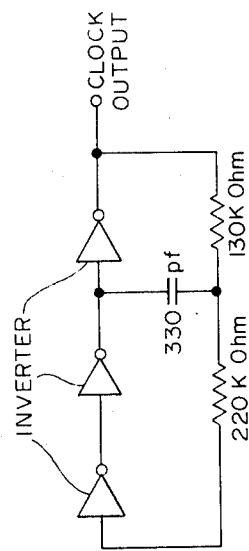
FIG. 4 is a block schematic showing an oscillator useable to clock the circuit of FIG. 3, and is on the same sheet as FIG. 2.

The circuit of FIG. 3 is clocked from any suitable clock source. The clock could be locally generated with any simple circuit such as that shown in FIG. 4. In the present embodiment it has been found that a clock of 10 KHz is satisfactory. The stability of such clock is of minor importance; the only requirement is that it be fast enough so as to allow the coding operation to follow the rate of change of $V_c$. The circuit of FIG. 4 is believed self-explanatory to those skilled in the art. The digital logic in the circuit of FIG. 3 (i.e. excluding the comparators, resistors and capacitors) is preferably realized in integrated CMOS (Complementary Metal Oxide Silicon) technology, having an operating supply voltage $V_{DD}$ of approximately +3.5 Volts d.c., with $V_c$ varying between 1 and 2.5 Volts d.c.

Given a control voltage $V_c$ that varies between 1 and 2.5 volts d.c., with 1 volt corresponding to full transmit and 2.5 volts corresponding to full receive, we assume that an upward variation in $V_c$ occurs which causes $V_S$ at the point 39 to increase. When $V_S$ increases beyond $V_m + \delta V$, the comparator 32 changes state at its output (from 0 to 1) thus causing D-flip-flop 61 to change state (from 0 to 1). The output of D-flip-flop 61, via NOR-gate 45 and NOR-gate 46, causes clock pulses to pass through the NOR-gate 46 to the counter 37 and, simultaneously, causes the counter 37 to count up. The complement of the counter is concurrently converted to an analog signal by the ladder network 38 and fed back to the point 39. As a result, the voltage $V_S$ decreases until it reaches the value of $V'_m + \delta V$, whereupon the comparator 32 reverts to its original state followed by D-flip-flop 61. The clock pulses are thus prevented from passing through the NOR-gate 46 and the counter 37 stops. The attenuation remains unaltered as long as the voltage $V_S$ remains within $V_m \pm \delta V$. The coding cycle starts again upon a new change in the value of the control voltage $V_c$. If $V_c$ were to cause $V_S$ to decrease below $V_m - \delta V$, the comparator 33 instead of the comparator 32 would change state at its output followed by D-flip-flop 62. The counter 37 would then count down instead of up and a similar cycle to that described above would develop. The function of the logic circuit 40 is summarized in the following table in relation to the outputs of the comparators 32 and 33:

| COMPARATOR 32 | COMPARATOR 33 | CLOCK TO COUNTER | UP OR DOWN |
|---|---|---|---|
| 0 | 0 | inhibited | down |
| 0 | 1 | clocked | down |
| 1 | 0 | clocked | up |
| 1 | 1 | (does not occur) | |

Clearly any logic circuit capable of performing as shown in the above table is a suitable one.

Should $V_c$ reach its upper or lower limit, the end limit decoder 36, which monitors the output of the counter 37, causes the logic circuit 40 to inhibit the passage of clock pulses to the counter 37, upon occurrence of all "0" or all "1" state. The counter is thus prevented from counting below on all "0" or beyond an all "1", which would otherwise suddenly change the attenuation of the attenuators 10 and 20 to its other extreme value.

The transmit and receive attenuators 10 and 20 of the present embodiment are identical and consist each of a simple resistor ladder network that is made capable of digital or stepwise control by means of the field effect transistors T1 and T5 in series with its shunt resistors R11 to R15. In the present embodiment the attenuators 10 and 20 operate into 300 KOhm loads, and the values of the resistors R11 to R20 in the attenuator 10 are as follows (details of the identical attenuator 20 are not shown in FIG. 3):

R11: 3.9K  R16: 91. K
R12: 5.1K  R17: 15. K
R13: 4.7K  R18: 3.9K
R14: 4.7K  R19: 1.2K
R15: 5.1K  R20: 1.2K

The field effect transistors T1 to T5 are directly driven from the outputs of the counter 37. An increase by 1 in the count of the counter 37 causes the attenuation of the transmit attenuator 10 to increase by approximately 1.6dB. It also causes the count at the output of the complement generator to decrease by 1, and hence the attenuation of the receive attenuator 20 to decrease by approximately 1.6dB. The total attenuation (and hence the total gain of the system) remains constant.

What is claimed is:

1. In a loudspeaking telephone system having a transmit and a receive channel and means for generating a control voltage dependent on comparative signal levels in said transmit and receive channels, the improvement comprising: two substantially identical variable digital attenuators, one in each of the transmit and receive channels, analog-to-digital converter means for encoding said control voltage into a digital representation, and means for generating the complement representation of said digital representation; said digital attenuators adapted to respond a predetermined one to said digital representation and the other to said complement representation, thereby oppositely changing their attenuation.

2. The improvement of claim 1 wherein said digital representation is a linear function of the control voltage.

3. In a loudspeaking telephone system having a transmit and a receive channel and means for generating a control voltage dependent on comparative signal levels in said transmit and receive channels, the improvement comprising: two substantially identical, digitally controllable attenuator networks, one in each of the transmit and receive channels; converter means for linearly converting a new value of said control voltage to a binary digital representation; and inverter means for converting said binary digital representation into its complement representation; whereby upon applying the digital representation to control a predetermined one of said two digitally controllable attenuators and the complement representation to control the other the two attenuator networks change their attenuation in opposite directions in response to said new value of said control voltage.

4. The improvement of claim 3 including means for sensing said control voltage and providing a voltage range within which said control voltage varies but said converter means remains quiescent.

5. The improvement of claim 4 wherein the two substantially identical digitally controllable attenuator networks are switched resistor ladder networks.

6. In a loudspeaking telephone system having a transmit and a receive channel and means for generating a control voltage in response to signal levels in said transmit and receive channels, the improvement comprising analog-to-digital converter means responsive to said control voltage for coding the same into a digital representation; means responsive to the analog-to-digital converter means for generating the complement representation of said digital representation; and two variable attenuators, one adapted to respond to said digital representation and the other adapted to respond to the complement representation, a predetermined one of the two attenuators being in the receive channel and the other in the transmit channel.

7. The improvement of claim 6, said variable attenuators being resistor ladder networks one adapted to respond to the digital representation and the other to its complement representation by means of gated switching devices connected in series with the shunt resistors in said ladder network; whereby a stepped change in their attenuation in opposite directions is effected by a change in the digital representation following a change in said control voltage.

8. The improvement of claim 7, said gated switching devices being unpowered metal-oxide-semiconductor field effect transistors having their gates each driven by one bit of one of said digital representation and its complement.

9. The improvement of claim 8, said digital representation being a binary representation and said complement representation being the logical negation thereof.

10. The improvement of claim 8, said digital representation being a binary representation, and said analog-to-digital converter means being a tracking analog-to-digital converter.

11. The improvement of claim 8, said digital representation being a binary representation, and said means for generating the complement representation being a plurality of inverters each inverting one bit of said binary representation.

12. The improvement of claim 8, said digital representation being a binary representation, and said analog-to-digital converter means having at its input means for tolerating a predetermined variation in said control voltage without responding thereto.

13. The improvement of claim 8, said digital representation being a binary representation, and said stepped change in the attenuation of said variable attenuation being a maximum of 3.5 dB.

* * * * *